G. T. WRIDE.
WRITING RANGER.
APPLICATION FILED DEC. 9, 1919.
1,347,729.
Patented July 27, 1920.
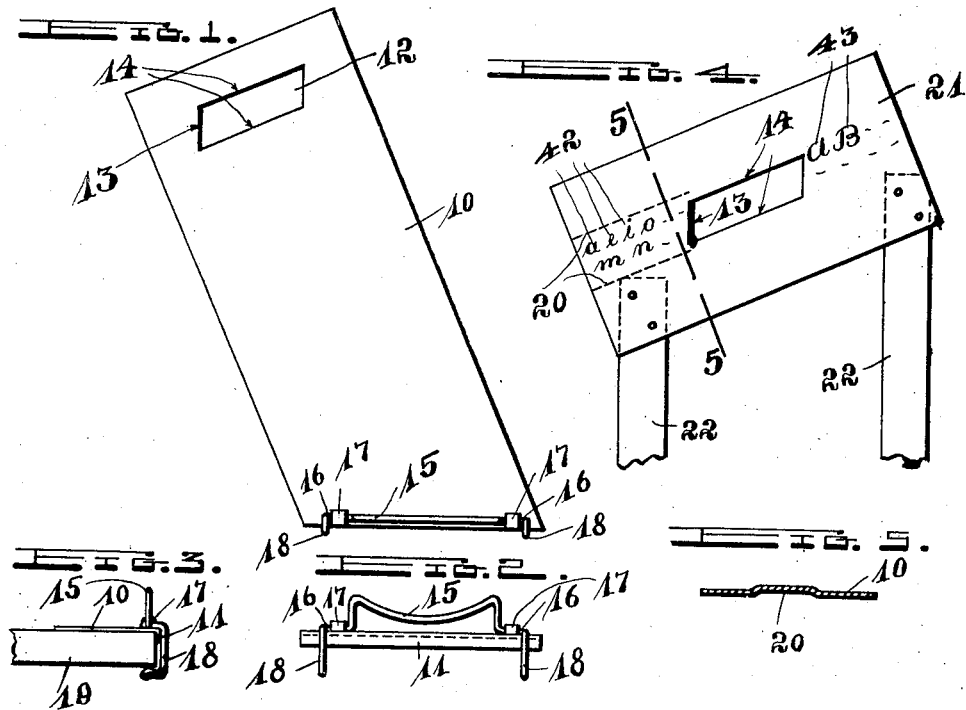
George T. Wride
INVENTOR

UNITED STATES PATENT OFFICE.

GEORGE T. WRIDE, OF LOS ANGELES, CALIFORNIA.

WRITING-RANGER.

1,347,729.  Specification of Letters Patent.  Patented July 27, 1920.

Application filed December 9, 1919. Serial No. 343,596.

*To all whom it may concern:*

Be it known that I, GEORGE T. WRIDE, a subject of the King of Great Britain, residing at Los Angeles, in the county of Los Angeles and State of California, have invented a new and useful Writing-Ranger, of which the following is a specification.

My invention relates to devices causing or influencing the writer to take the correct position when writing and helping to place or indicate the correct position of writing material before the writer.

One object of this invention is to bring the writer into proper position before the writing material.

Another object is to indicate the proper position of the point or range where the writing should be produced on the writing material in proper relation to the body or the position of the writer.

Another object is to provide a device which will engage itself to the table on which the writing is to be produced in proper position before the writer.

Another object is to provide a device which will tend to cause the writer to sit properly before the desk and before the writing material on which the writer intends to produce the writing.

Another object is to provide a device which will tend to locate the writer's arm properly on the desk and in proper relation to the point or range of writing.

Another object is to provide a device which will tend to instruct and guide in proper writing.

Another object is to provide a device with suitable indicating material for instructing and guiding in proper writing and for providing for the teaching of a whole class in the art of penmanship.

Other objects will appear from the following description and appended claims as well as from the accompanying drawing, in which—

Figure 1 is a top plan view of a simple form of my device.

Fig. 2 is a front edge view of the device of Fig. 1.

Fig. 3 is a side edge view of the device of Figs. 1 and 2.

Fig. 4 is a top plan view of a slightly modified form of my device.

Fig. 5 is a cross section through the device on line 5—5 of Fig. 4.

Similar numbers refer to similar parts throughout the several views.

In Fig. 1 is an illustration of a simple form of my device of which the plate 10 is the main body. I wish it understood before going into the details of description that the device has been constructed and designed to serve the several objects stated in the beginning of this specification, but mainly to help and guide in proper writing. For that reason it is immaterial what form the outer appearance of this device discloses. It is really more important and one of the main points in view to instruct a writer in properly writing, not only of what appears or will appear on the paper or other material on which writing is produced but also where to produce such writing in proper relation to the body of the writer. The plate 10 is therefore in the first place constructed so and provided with such means as to locate the position of the writer and also to locate the proper position of the writing material before the writer. Such writing position, or as I shall call it hereafter "range," is indicated at 12 in Figs. 1, and 4. This writing range must be properly located before the writer to enable the writer to write with ease and in accordance with good penmanship. To locate this range properly, it is naturally necessary to provide certain means on the plate 10 to bring and hold the range at a correct point on the table in a correct position to the writer. In Figs. 1, 2, and 3, the plate 10 is extended in its full width to the edge of a table and provided with a bent edge 11 to engage over the front edge of such table. Such means (bent edge), of course, is not absolutely necessary and other means can easily be found and provided without departing from the principle of this invention, the main point being only to have certain means for definitely locating the range 12 in correct position before the writer. In Fig. 4 is a slightly modified form of locating means; the two straps 22 connect with and hold the plate 21 to the edge of the table in a similar manner as the full length of the plate 10 in Fig. 1. The plate 21, being the equivalent of the plate 10 proper, naturally has only to be large enough to allow a suitable frame or a suitable amount of material around the range 12, no matter of what shape, round, square, or any other suitable form will do, as long as the writer is confined to the space within the range 12 for writing.

The range 12 is properly located when the edge 13 is approximately directly in front of the writer and square or at about right angle to the front edge of the table top. The arm of the writer should rest on the table with the elbow about two inches from the front edge of the table and the hand directly in front of the writer. The elbow, then naturally resting on the front edge of the table, forms the pivot for the writing motion of the hand sidewise, so that the length, so to say, of the range is in the direction of the arc described by the hand swinging sidewise from the starting point directly in front of the writer to about two and one-half inches sidewise. The edges 14 are suitably spaced to allow writing, being practically equal to the length or height of the largest letters with a suitable margin so the pen will not touch the edges 14 in writing within the space or range 12.

For clamping or holding or engaging the device to the table in the correct position, when once established, suitable means are provided. In Figs. 1, 2, and 3, a clamping device is provided forming at the same time the support or guiding position or rest for the arm. The arm rest 15 is preferably pivotally engaged to the plate 10. The rest portion 15 is formed to allow an arm to properly rest on the device, that is at the same time on the table, in the correct position to the range 12. Extension ends 16 form the pivots, turnably mounted in the yokes or boxes 17. Further extensions 18 form spring-like members to engage over the table to hold the device in place, a portion of a table being indicated at 19, in Fig. 3.

In using this device it is the most convenient thing to place writing paper, or similar material on which the writing is to be produced, under the device so that the writing can only be produced within the range 12, the rest of the paper being covered by the plate 10, or the main body of the device. The hand, that is the writer commences to write near the edge 13 and continues between the edges 14 over to the opposite edge away from the edge 13. Then the paper is slipped a suitable distance to the left to bring the last of the writing to just remain out from under the edge 13 so that the writing can be continued along the range and within the range.

Writing with ink, it is advisable to space the material of the device above the writing material so that the wet writing cannot blot, a section of this portion showing such spacing is shown in Fig. 5 in relation to Fig. 4, which will make this understood and clear. Equal effect can be had in otherwise arranging for the spacing of the device above the writing material. The top edge of the device can be slightly rolled over.

From this it will easily be understood that I do not wish to limit myself to any specific design to such spacing of the device above the writing material, and it will also be understood that many other modifications can be produced giving similar effect as described above, which is the only point in view to keep the device spaced so that the writing will not blot.

Model writing and model letters are preferably displayed or marked on the face of the device near the range aperture 12; small letters 42 and capital letters 43 are indicated in Fig. 4, but it will easily be understood that any number of letters or other model writing figures or other marks can be shown on the device to serve as a guide for the student.

Having thus described my invention, I claim:

1. In a writing ranger of the class described, a body member consisting of a plate having an aperture forming the range within which the writing is to be produced and having means for locating and holding such body with the range in correct position before the writer.

2. In a writing ranger of the class described, a body member consisting of a plate having an aperture forming the range within which the writing is to be produced and having means for locating and holding such body with the range in correct position before the writer, and means for locating the position of the arm of the writer.

3. In a writing ranger of the class described, a body member consisting of a plate having an aperture forming the range within which the writing is to be produced and having means for locating and holding such body with the range in correct position before the writer, means for locating the position of the arm of the writer in correct relative position to the device, and clamping means for securing the device to a writing desk.

4. In a writing ranger of the class described, a body member having an aperture forming the range within which the writing is to be produced, means for locating the device with regard to its range aperture in correct position to the writer, means for locating the position of the arm of the writer in correct relative position to the range, and means for holding the device before the writer in correct ranging position as regards the range within which the writing is produced by the writer while the writing material on which the writing is produced is shifted so that the writing can be continued on such material within the range.

5. In a writing ranger of the class described, a plate having an aperture forming the range within which the writing is to be produced, the plate being provided with means extending to the edge and engaging over the edge of the desk on which the device is being used thereby locating the range in correct position before the writer, an arm support provided near the desk edge on the device for holding the arm of the writer in correct position to the range, the arm support having spring-like members for engaging over the top plate of the desk for holding the device in such correct position before the writer.

6. In a writing ranger of the class described, a plate having an aperture forming the range within which the writing is to be produced, the plate being provided with means extending to and over the front edge of a desk or other place where this device is being used for locating the range in the plate in correct position before the writer, an arm support provided near the desk edge swingably engaging with the device, and extending ends on the arm support forming spring-like engaging members to engage the device to the desk when the arm support is swung into supporting position and so placed on the desk.

7. In a writing ranger of the class described, a plate having an aperture forming the range within which the writing is to be produced, the plate being provided with means extending to and over the front edge of a desk for locating the range in the plate in correct position before the writer, an arm support provided near the desk edge swingably engaging with the device, extending ends on the arm support forming spring-like engaging members to engage the device to the desk when the arm support is swung into supporting position and so placed on the desk, and teaching material displayed on the device near the aperture.

8. In a writing ranger of the class described, a plate having an aperture forming the range within which the writing is to be produced, the plate being provided with means extending to and over the front edge of a desk for locating the device in correct position before the writer, an arm support provided on the device for locating the arm of the writer in correct position to the device, engaging means on the device for holding the device on the desk, and model writing material displayed on the device.

In testimony that I claim the foregoing as my invention I have signed my name in the presence of two subscribing witnesses.

GEORGE T. WRIDE.

Witnesses:
OTTO H. KRUEGER,
JESSIE A. MANOCK.